United States Patent Office 3,249,411
Patented May 3, 1966

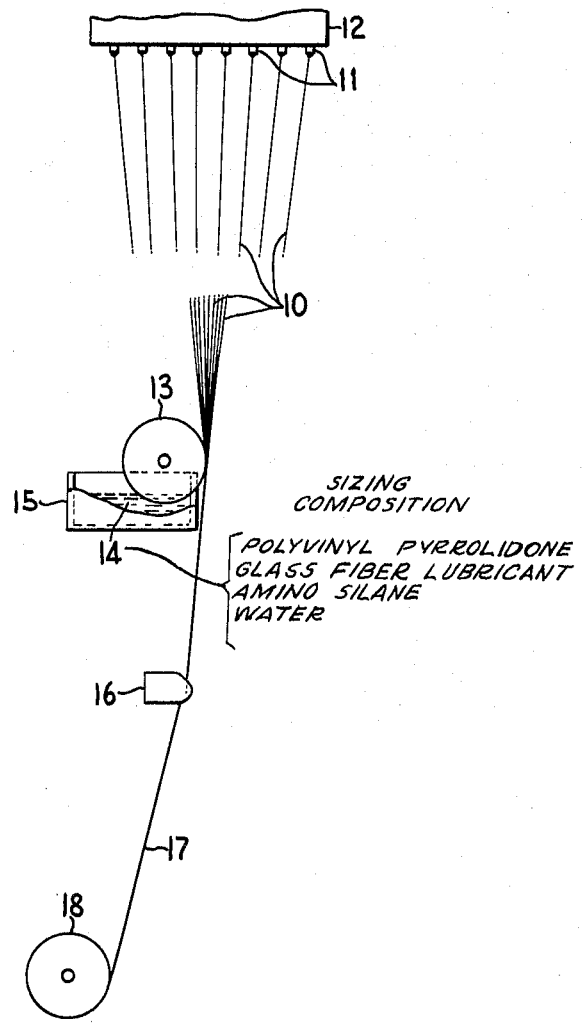

3,249,411
METHOD OF FORMING A GLASS FIBER
REINFORCED RESINOUS BODY
Donald E. McWilliams, O'Hara Township, James J. Fasnacht, Shaler Township, and George E. Eilerman, Ross Township, Pa., assignors to Pittsburgh Plate Glass Company, Pittsburgh, Pa., a corporation of Pennsylvania
Filed Mar. 21, 1963, Ser. No. 266,836
4 Claims. (Cl. 65—3)

The present invention relates to sizing glass fibers which are to be used as reinforcement for phenolic resins.

A glass fiber strand is composed of a multitude of fine glass filaments which are formed by being drawn at a high rate of speed from molten cones of glass located in U.S. Patent No. 2,133,238. During manufacture, the filaments are coated while moving at a rate of speed of the order of 500 to 20,000 feet per minute with a size which contains a binder to give the strand integrity for workability, i.e., for twisting, plying and weaving. If the strand does not have proper integrity, fuzzing occurs during these operations and eventually the strand may break. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers substantive and compatible with the particular resins with which they are to be employed.

When the glass fibers are used in the form of strand, i.e., roving or chopped strand or twisted strand, for resin reinforcement, the coupling agent is usually combined with the size and applied with the size to the fibers during their formation. The size employed is usually an aqueous dispersion of a film-forming, synthetic resin and a glass fiber lubricant. Roving is formed by combining a number of strands in parallel form and winding the strands on a tubular support in a manner such that the combined strands may be unwound and used to form woven roving or chopped strands. Twisted strand (single end on a bobbin) is made according to conventional textile twisting techniques by removing the strand from the forming package and winding it on a twister bobbin. It is, therefore, necessary that the strand have good integrity and resistance to fuzzing during the steps employed to make the twisted strand or roving and fabricate them into forms suitable for use as a resin reinforcement.

It is desirable in the formation of glass fiber laminates that the reinforcing resin completely impregnate the glass fiber strands and wet the surface of the fibers as quickly as possible in order to reduce the time required to make the laminates. It is an object of this invention to provide a glass fiber roving which has been treated with a size which imparts good "wet-out" properties to the glass fibers when used as reinforcement for phenolic resins.

When glass fiber strands are to be used as a reinforcement for resins, it is desirable that they impart to the finished article high wet and dry flexural strength. It is a further object of this invention to provide a glass fiber sizing composition for use in sizing glass fibers for phenolic resin reinforcement which size imparts increased flexural wet and dry strength to the reinforced article.

It is another object of this invention to provide a glass fiber reinforced phenolic resin article in which the phenolic resin is securely bonded to the glass fibers.

It is still another object of this invention to provide a glass fiber roving which has been impregnated with a phenolic resin.

It is yet another object of this invention to provide a glass fiber reinforced phenolic resin article having low moisture absorption.

These and other objects are accomplished by the practice of this invention which, briefly, comprises treating glass fiber strands, during their formation with an aqueous size which consists essentially of from 2 to about 10 percent by weight of a polyvinyl pyrrolidone, from about 0.1 to about 1 percent by weight of a glass fiber lubricant, and from about 0.1 to about 2 percent by weight of a coupling agent selected from the group consisting of amino alkyl dialkoxy silanes, amino alkyl trialkoxy silanes and hydrolyzed derivatives thereof. The sized strands are then used as reinforcement for phenolic resins.

By the term "a polyvinyl pyrrolidone" is meant any homopolymer obtained by the addition polymerization of a monomer which may be represented by the formula

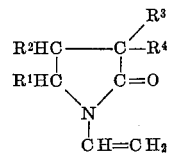

wherein $R^1$, $R^2$, $R^3$, $R^4$ may each be hydrogen or lower alkyl. Examples of such monomers include N-vinyl-2-pyrrolidone, 5-methyl-N-vinyl-2-pyrrolidone, 4-methyl-N-vinyl-2-pyrrolidone, 5-ethyl-N-vinyl-2-pyrrolidone, 4-ethyl-N-vinyl-2-pyrrolidone, 3-methyl-N-vinyl-2-pyrrolidone, 3-ethyl-N-vinyl-2-pyrrolidone, 3,3-dimethyl-N-vinyl-2-pyrrolidone, 3,5-dimethyl-N-vinyl-2 - pyrrolidone, etc. These monomers and their homopolymerization products are known in the art. It is preferred that the polyvinyl pyrrolidone have an average molecular weight of from about 5,000 to 100,000.

Amino-alkyl alkoxy silanes which are contemplated for use in the present invention include those illustrated by the following structural formula:

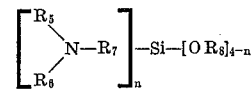

wherein $R_5$ may be H, an alkyl radical containing 1 to 5 carbon atoms or $HNHCH_2-CH_{2x}-$, $x$ being 1 to 5, $R_6$ may be H or an alkyl or acyl radical containing 1 to 5 carbon atoms, $R_7$ and $R_8$ are alkyl radicals preferably containing 1 to 5 carbon atoms or substituted alkyl radicals, and $n$ is a whole number from 1 to 3, preferably 1. Typical examples of these amino-alkyl alkoxy silane include gamma-amino-propyl triethoxysilane and similar silanes produced in the manner shown in U.S. Patent No. 2,832,754, the disclosure of which is incorporated herein by reference.

Other amino-alkyl alkoxy silanes which may be used are represented by the following structural formula:

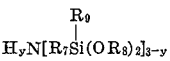

wherein $y$ is a whole number from 0 to 2, $R_7$ and $R_8$ are alkyl radicals preferably containing 1 to 5 carbon atoms and $R_9$ is alkyl or aryl. Typical examples of these silanes include gamma-aminopropylmethyl-diethoxysilane, delta-aminobutylmethyl-diethoxysilane and similar silanes produced in the manner shown in U.S. Patent No. 2,930,809, the disclosure of which is incorporated herein by reference. Moreover, polymers produced from the hydrolysis products of these amino-alkyl alkoxy silanes may also be employed in place of, or in addition to the amino-alkyl alkoxy silanes and, or hydrolysis products of the amino-alkyl alkoxy silanes, said polymers being formed of the hydrolysis products of the amino-alkyl alkoxy silanes as set forth in U.S. Patent No. 3,045,036.

The preferred glass fiber lubricant for use in the size compositions of the present invention is a cationic-active, acid-solubilized, fatty acid amide. A suitable material is manufactured by the Arnold Hoffman Company under the trade number 185A. It is an anhydrous material which is a deep reddish, amber, viscous liquid at room temperature. It is water dispersible and a 1 percent solution has a pH of 8.9 to 9.4. Other commercially available, acid solubilized, fatty acid amides such as stearic amide are useful as glass fiber lubricants in the practice of the invention. These include both saturated and unsaturated fatty acid amides wherein the acid group contains from 4 to 24 carbon atoms. Also included are anhydrous, acid solubilized polymers of the lower molecular weight unsaturated fatty acid amides.

Another glass fiber lubricant which can be used in the size is an alkyl imidazoline derivative which includes compounds of the class u-alkyl N-amidoalkyl imidazolines which can be formed by causing fatty acids to react with polyalklyene polyamines under conditions which produce ring closure. These imidazolines are described more fully in U.S. Patent No. 2,200,815. Other suitable imidazolines are described in U.S. Patents Nos. 2,267,965, 2,268,273 and 2,355,837.

The size can contain a wetting agent. The wetting agent is preferably cationic or non-ionic and it may also serve as an additional lubricant. Any lubricant material can be employed which is conventionally known to be useful as such and will reduce the surface tension of the sizing solution so that it is about 25 to 35 dynes per square centimeter. Such materials include cetyl or stearyl monoamine hydrochloride or acetate, dodecyl amine, hexadecyl amine and secondary and tertiary derivatives of the same, for example, dodecyl methyl amine and salts thereof. Alkyl quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms can be used. Other examples of suitable wetting agents are polyoxyethylene.

The total solids content of the sizing solution is about 2 to 5.5 percent by weight of the solution. In all events, the amounts of the various ingredients should not exceed that amount which will cause the viscosity of the solution to be greater than about 100 centipoises at 20° C. solutions having a viscosity greater than 100 centipoises at 20° C. are very difficult to apply to glass fiber strands during their formation without breaking the strand. It is preferred that the viscosity of the size be between 2 and 20 centipoises at 20° C. for best results. The viscosity of the size composition is also affected by the molecular weight of the polyvinyl pyrrolidone. Thus, by proper selection of the polyvinyl pyrrolidone, the viscosity of the size may be controlled.

The sizing composition is applied to the individual glass fibers during their formation in the manner illustrated in the drawing. The sizing composition is applied to the individual fibers 10 just after their emergence from orifices 11 in an electrically heated, platinum alloy bushing 12 containing molten glass. The sizing composition is applied to the filaments prior to the time they are grouped together to form a strand by means of a roller applicator 13 which is partially submerged in the sizing solution 14 contained in a reservoir 15. Such an applicator is shown in more detail in U.S. Patent No. 2,728,972. The fibers are grouped into a strand 17 by a graphite guide 16 and wound around a forming tube 18 rotating at approximately 7500 r.p.m. to produce a strand travel of approximately 12,000 to 15,000 feet per minute. Other methods of applying the size to the strand of glass fibers, such as a pad applicator, may be employed and the strand may be formed by means other than winding on the forming tube, such as by means of a pair of rotating wheel pullers which direct the strand into a suitable collecting device.

The glass fiber strands wound on the forming tube 18 are then dried. This may be done by heating them at a temperature and for a length of time sufficient to remove substantially all of the water, for example at about 275° F. for 8 hours. This drying causes the coupling agents to fix themselves to the glass surface and to produce the degree of strand integrity and hardness required for forming the strand into a woven cloth or woven roving. The solids content of size on the strands averages about 0.3 to 2.0 percent by weight, preferably about 0.5 percent by weight.

After the glass strands have been sized as described above, they are associated into a suitable form for phenolic resin reinforcement and then combined with a phenolic resin to produce a glass fiber reinforced phenolic resin article.

The glass strands may be associated into any form suitable for resin reinforcement. Thus, they may be chopped into short lengths (chopped strand) and used for reinforcing a phenolic resin. A number of strands may be combined into parallel form to form roving. This roving may be used as such or may be woven into cloth for phenolic resin reinforcement. The sized glass fiber strands may also be formed into non-woven matting, hammermilled fibers, yarns, woven cloths, etc. for use as phenolic resin reinforcement.

In one embodiment of this invention, the sized glass strands are grouped into roving and the roving is impregnated with a solution of a phenolic resin to form a prepreg or pre-loaded article. These prepregs may then be used in accordance with conventional molding and filament winding techniques. Thus, the prepregs may be used as such or may be chopped up for use in compression molding.

The phenolic resins which the sized glass fibers are used to reinforce are well known in the art. They are obtained by the condensation of a phenol, such as phenol, cresol, xylenol, resorcinol, etc. with an aldehyde such as formaldehyde, acetaldehyde, furfural, etc. They are preferably used in the form of solutions. The solvent may be water, methanol, etc. Some commercially available phenolic resins and their properties are listed below:

|  | Resinox RS-6882 | Resinox TS-6249 | Resinox TS-6250 |
| --- | --- | --- | --- |
| Solids Content, Percent | 75-79 | 62-66 | 68-72 |
| Viscosity & 25° C., cps | 1,500-2,500 | 40-180 | 600-750 |
| Specific Gravity & 25° C | 1.20-1.25 | 1.06-1.11 | 1.11-1.16 |
| pH & 25° C | 7.5-8.0 | 7.6-8.4 | 7.8-8.5 |

All of these resins are one-stage resins. Other commercially available phenolic resins include Plyophen 5030 and Plyophen 5027/5592.

The best modes contemplated for carrying out this invention are illustrated in the following examples:

*Example 1*

Ingredient: Parts by weight
    Polyvinyl pyrrolidone K-30 (a homopolymer of N-vinyl-2-pyrrolidone having an average molecular weight of about 40,000) _____ 100.0
    Pelargonic acid amide solubilized in water with acetic acid (RL-185) _____ 4.5
    Gamma-amino-propyl triethoxysilane _____ 5.0
    Water _____ 1900.0

Two-hundred fifty (250) gallons of the glass fiber size can be made by mixing the polyvinyl pyrrolidone in about 150 gallons of water in a mixing tank. The glass fiber lubricant RL-185 is added to about 7 gallons of water maintained at a temperature of about 130 to 160° F. and thoroughly mixed therein. The mixture is then added to the aqueous polyvinyl pyrrolidone. The gamma-amino-propyl triethoxysilane is then added to the aqueous mixture and sufficient water is added to make 250 gallons of sizing solution. This size is applied to glass strands and the sized strands are dried as described above. The strands are then collected in parallel form to form 20-end roving. The roving is drawn through a tube of Plyophen 5030 resin (a cresol base laminating varnish containing about 60 percent solids having a viscosity at 25° C. of 275–450 centipoises and a specific gravity at 25° C. of 1.022–1.029) to impregnate the roving with the phenolic resin. The impregnated roving is passed through a die (0.046 inch in diameter) at the bottom of the tube and then through a 6 foot column which is heated to 220° F. at the top and 330° F. at the bottom. The impregnated roving (prepreg) is then wound on a flanged wheel at a rate of 6 feet per minute. The prepreg is subsequently cut into sections which are placed into a compression mold and molded at 325° F. for 45 minutes. Each molded sample has a glass content of approximately 77.6 percent by weight and is approximately ⅛ inch by 1 inch by 5 inches. The flexural strength is determined by test method ASTM D790–49T to be 106,200 p.s.i. Subsequently, the samples are boiled in water for varying lengths of time as indicated below and again tested for flexural strength. The percent of the original amount of flexural strength which remains is reported below as "Retention." To determine the amount of water absorbed, the samples are weighed before and after boiling. The amount of water absorption is indicated below in percent weight increase.

|  | 6 hr. boil | 16 hr. boil | 20 hr. boil | 24 hr. boil |
| --- | --- | --- | --- | --- |
| Retention (percent) | 81 | 96.8 | 96.0 | 90.4 |
| Weight increase (percent) |  | 2 | 4 | 4 |

These results indicate that the phenolic resin glass fiber reinforced articles of this invention possess high dy flexural strength, remarkable retention of flexural strength after boiling and that they reach an equilibrium at a low level of moisture pickup after boiling for about 20 hours.

*Example 2*

A size composition is formulated as described in Example 1. This size composition is applied to glass strands and the sized strands are dried as described above. The strands are collected in parallel form to form 20-end roving and the roving is drawn through a tube of Plyophen 5027/5592 resin. The impregnated roving is then passed through a heated column as described in Example 1. The resultant prepreg is used in combination with Kraft paper (Mosinee #151) to form an 8 ply laminate. The laminate is laid up with the prepregs oriented 35° to the median and the laminate is pressed at 150 p.s.i. Samples are cut from the laminate for testing. After immersion in water for 7 days at 150° F., the samples absorb only 0.9 percent by weight of water. Moreover, the tensile strength has increased by an average of 20 percent over that of the samples before immersion. After 14 days' immersion at 150° F., the water absorption is only 1.06 percent by weight.

*Example 3*

The process of Example 1 is repeated with the sole exception that the polyvinyl pyrrolidone K–30 is replaced with an equal amount of polyvinyl pyrrolidone K–15, a homopolymer of N-vinyl-2-pyrrolidone having an average molecular weight of about 10,000. The resultant sizing composition has a lower viscosity than the sizing composition of Example 1. A good bond is achieved between the phenolic resin and the glass strand reinforcement.

Further examples of sizing compositions which may be used in accordance with the practice of this invention are as follows:

*Example 4*

| Ingredient: | Parts by weight |
| --- | --- |
| Polyvinyl pyrrolidone K–30 | 150.0 |
| Gamma-amino-propyl triethoxysilane | 5.5 |
| Tetraethylene pentamine amide of stearic acid solubilized in water with methacrylic acid | 4.0 |
| Water | 1950.0 |

*Example 5*

| Ingredient: | Parts by weight |
| --- | --- |
| Homopolymer of 5-methyl-N-vinyl-2-pyrrolidone | 75.0 |
| Gamma-aminopropylmethyldiethoxysilane | 4.0 |
| Cationic lubricant (RL–185) | 4.0 |
| Water | 1950.0 |

*Example 6*

| Ingredient: | Parts by weight |
| --- | --- |
| Homopolymer of 3,5-dimethyl-N-vinyl-N-pyrrolidone | 140.0 |
| Gamma-amino-propyl triethoxysilane | 7.5 |
| Cationic lubricant | 7.5 |
| Water | 1950.0 |

The sizes of Examples 4 to 6 are applied to strands in the same manner as described above with respect to the size of Example 1 and the treated strands are dried as described above. They may be fabricated into various products, such as twisted strand, cloth, chopped strand, chopped strand mat, roving and woven roving. These products are then used as reinforcement for various phenolic resins. The sized glass strands have excellent "wet-out" properties. "Wet-out" refers to the rate at which the impregnating resin will flow among the filaments of the reinforcing glass strands, thus wetting the glass.

Although the present invention has been described with respect to specific details of certain embodiments thereof, it is not intended that such details act as limitations upon the scope of the invention except insofar as set forth in the accompanying claims.

We claim:

1. In a method of forming a glass fiber, reinforced resinous body which comprises forming glass fiber strands, applying to the strands during their formation while they are moving an aqueous sizing composition, drying the treated strands, fabricating the glass fiber strands into a form suitable for combining with a phenolic resin reinforcement, combining the fabricated strands with a curable phenolic resin and curing the combination to form the reinforced body, the improvement which comprises using an aqueous sizing composition consisting essentially of from about 2 to about 10 percent by weight of a polyvinyl pyrrolidone, from about 0.1 to about 2 percent by weight of a glass fiber lubricant and from about 0.1 to about 2 percent by weight of a coupling agent selected from the group consisting of amino alkyl dialkoxy silanes, amino alkyl trialkoxy silanes and hydrolyzed derivatives thereof, the total solids content of the sizing composition being 2 to 5.5 percent by weight and the viscosity of the solution being less than 100 centipoises at 20° C.

2. The method of claim 1 wherein said coupling agent is gamma-amino-propyl triethoxysilane.

3. The method of claim 1 wherein said polyvinyl pyrrolidone is a homopolymer of N-vinyl-2-pyrrolidone.

4. The method of claim 1 wherein the glass fiber lubricant is a cationic, acid-solubilized, fatty acid amide.

References Cited by the Examiner

UNITED STATES PATENTS 2,809,953 10/1957 Werner et al. _____ 117—126
2,931,739 4/1960 Marzocchi et al. _____ 117—126

DONALL H. SYLVESTER, *Primary Examiner.*

C. VAN HORN, G. R. MYERS, *Assistant Examiners.*